Figure 1:
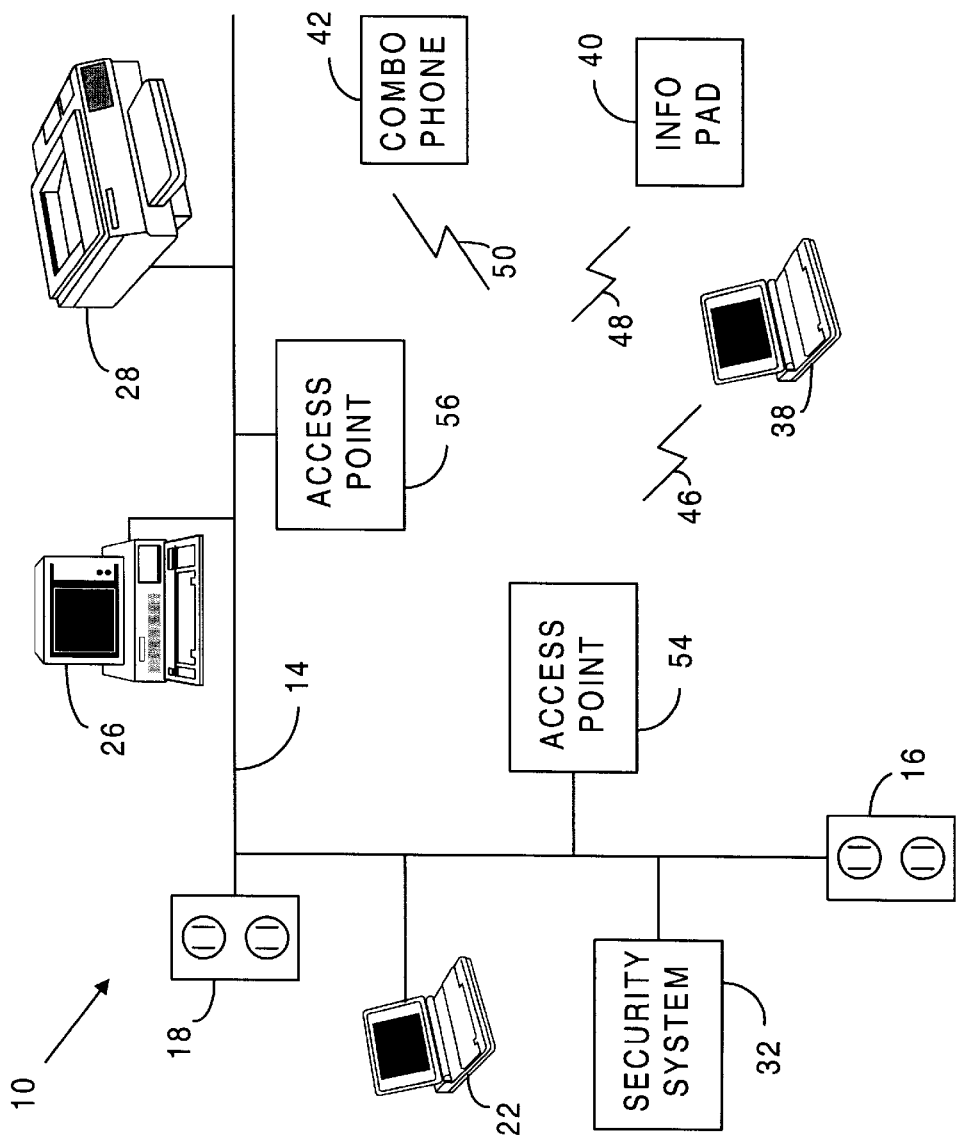

United States Patent [19]
Lueker et al.

[11] Patent Number: 6,130,896
[45] Date of Patent: Oct. 10, 2000

[54] WIRELESS LAN SEGMENTS WITH POINT COORDINATION

[75] Inventors: Jonathan C. Lueker, Portland; Scott B. Blum; Steven D. Kassel, both of Beaverton; Phil W. Martin, Banks, all of Oreg.

[73] Assignee: Intel Corporation, Santa Clara, Calif.

[21] Appl. No.: 08/954,383

[22] Filed: Oct. 20, 1997

[51] Int. Cl.[7] .................................................. H04H 1/14
[52] U.S. Cl. ........................ 370/469; 370/463; 370/420
[58] Field of Search .............................. 455/3.3; 370/312, 370/389, 469, 420, 463

[56] References Cited

U.S. PATENT DOCUMENTS

| | | | |
|---|---|---|---|
| 4,815,106 | 3/1989 | Propp et al. | 375/257 |
| 5,255,268 | 10/1993 | Cato et al. | 370/405 |
| 5,712,614 | 1/1998 | Patel et al. | 455/3.3 |
| 5,748,104 | 5/1998 | Argyroudis et al. | 340/870.11 |
| 5,835,005 | 11/1998 | Furukawa et al. | 370/464 |
| 5,937,342 | 8/1999 | Kline | 455/3.3 |
| 5,994,998 | 11/1999 | Fisher et al. | 455/3.3 |

OTHER PUBLICATIONS

Gershon, Ron, David Propp, and Michael Propp, "A Token Passing Network for Powerline Communications", Adaptive Networks, Inc., *IEEE Transactions on Consumer Electronics*, vol. 37, No. 2, May 1991, pp. 129–134.

"AN1000EVK Evaluation Unit Manual: Draft 1.0" (Document No. 04–3170–01–B), Adaptive Networks, Inc., Brighton, MA, Aug. 1996, 31 pages.

"AN1000 Powerline Network Communications Chip Set" (Document No. DS–GCS–1000–0495–01), Adaptive Networks, Inc., Brighton, MA, 1995, 56 pages.

"AN1000 Powerline Network Communications Module", Adaptive Networks, Inc., Brighton, MA, 18 pages.

*Primary Examiner*—Huy D. Vu
*Assistant Examiner*—Dung Trinh
*Attorney, Agent, or Firm*—Alan K. Aldous

[57] ABSTRACT

In one embodiment of the invention, an access point for use in a powerline based network includes first physical layer circuitry to interface with a powerline and second physical layer circuitry to interface with an antenna. The access point also includes circuitry to interface between the first and second physical layer circuitry. The first and second physical layer circuitry and the circuitry to interface between the first and second physical layer circuitry allow an untethered electrical device to have data communication through the powerline with an electrical device tethered to the powerline. Under another embodiment of the invention, a powerline based network includes a powerline and an access point connected to the powerline and capable of wireless communication.

28 Claims, 6 Drawing Sheets

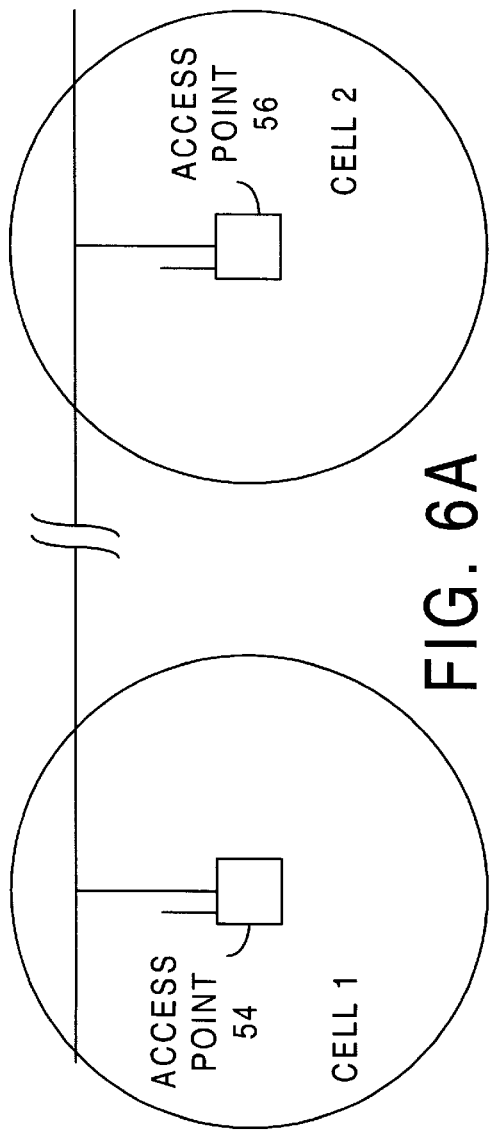
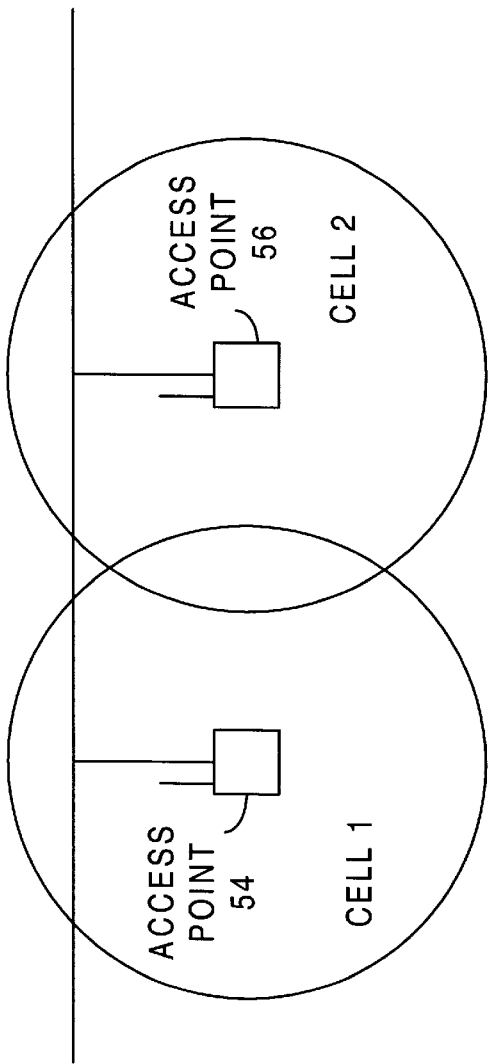

WIRELESS LAN SEGMENTS WITH POINT COORDINATION

BACKGROUND OF THE INVENTION

1. Technical Field of the Invention

The present invention relates to a network having a powerline backbone and, more particularly, to such as a network that includes wireless communication.

2. Background Art

Electrical powerlines, such as are typically found in homes and businesses, have been used as a medium through which signals may communicate from one electrical device to another over a local area network (LAN). For example, a network of two personal computers may be created as follows. A first computer is interfaced through wires to an outlet of the powerline. A second computer is interfaced through wires to another outlet of the powerline. In the United States, powerline signals typically have a frequency of about 60 Hz. Network signals that have a frequency that is substantially higher than 60 Hz pass between the computers on the powerline. A high pass filter is used to filter out the 60 Hz power signal.

Relatively expensive radio frequency (RF) technology has also been used to connect computers or other electronic devices in the home or business through RF signals, rather than through a powerline. Such technology has included direct sequence spread spectrum and frequency hopping spread spectrum technology and provides relatively high frequency data signals. Such technology may work fairly well over a hundred foot or more radius and the signals associated therewith can reliably pass through typical walls. This RF technology has the advantage of allowing electronic devices to be untethered to a wall. However, typically, the RF base station is connected at or very close to the electronic device, such as a computer, which may not be optimally positioned for reliable data signal transmission or reception. Further, this technology is prohibitively expensive for many consumers and businesses.

Significantly less expensive RF technology has been used to allow electronic devices to communicate through RF signals. Such technology has much smaller transmission and reception areas and cannot reliably pass signals through walls. Further, the RF base station is typically connected at or very close to the electrical device which may not be optimally positioned for reliable data signal transmission or reception, further reducing transmission and reception area. The area of reception may be so small as to not completely cover many houses. Because of the small area of transmission and reception and lack of reliability, such technology is unsatisfactory for many applications.

Accordingly, there is a need for a network wherein untethered electrical devices may communicate with other devices in the network through relatively inexpensive equipment.

SUMMARY OF THE INVENTION

In one embodiment of the invention, an access point for use in a powerline based network includes first physical layer circuitry to interface with a powerline and second physical layer circuitry to interface with an antenna. The access point also includes circuitry to interface between the first and second physical layer circuitry.

Under another embodiment of the invention, a powerline based network includes a powerline and an access point connected to the powerline and capable of wireless communication.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 1 is a partially schematic and partially block diagram representation of a powerline based network accordingly to an embodiment of the present invention.

FIG. 2 is a partially schematic and partially block diagram representation of an access point used in the network of FIG. 1.

FIG. 3 is an alternative embodiment of the access point of FIG. 2.

FIG. 4 is a block diagram of a tethered electrical system including a powerline network adapter.

FIG. 5 is a block diagram of a untethered electrical system including an RF network adapter.

FIG. 6A illustrates two cells within a powerline based network, wherein the cells do not overlap.

FIG. 6B illustrates two cells within a powerline based network, wherein the cells do overlap.

FIG. 7 is a block diagram representation of details of one embodiment of the router of FIG. 2.

DETAILED DESCRIPTION OF PREFERRED EMBODIMENTS

Referring to FIG. 1, one embodiment of the invention includes a powerline based network 10 having a powerline 14, such as one that is typical of those that carry electrical power within a house or other building. The present invention is not restricted to any particular type of powerline. Powerline 14 may include a variety of wires connected through, for example, junction boxes (not shown). Electrical outlets, such as outlets 16 and 18 provide, may power from the powerline 14 to various electrical devices. Examples of the electrical devices include a portable computer 22, a desk top computer 26, and a printer 28. Other electrical devices could include, for example, a security system 32. If included in the network, devices 22, 26, 28, and 32 are tethered to powerline 14 through a powerline adapter of some sort and an outlet or another connection.

A portable computer 38, an info pad 40 (such as a personal data assistant (PDA)), and/or a combination telephone 42 are examples of devices that are not tethered with respect to powerline 14. Tethered means physically connected through some sort of tangible conductor. Untethered means not physically connected, although it may be connected through electromagnetic or optical signals through the air. Untethered electrical devices may be in electrical communication through, for example, RF signals with one or more of the electrical devices coupled to network 10, including a tethered electrical device or another untethered electrical device. (Wireless communication signals other than RF signals may be used.) Portable computer 38, info pad 40, and combination telephone 42 may be in wireless communication with devices in network 10 through RF signals 46, 48, and 50, and one or more access points, such as access points 54 or 56. One of the electrical devices may in turn be in communication with a larger network (e.g., through a modem in computer 26). An untethered electronic device may be referred to as a transmitting/receiving station.

Referring to FIG. 2, one embodiment of an access point 54 includes ports 58 and 60. Physical layer circuitry 62 for RF is connected to an RF transmitter/receiver antenna 64 through port 58. Any of various suitable antennae may be used. A medium access controller (MAC) 66 interfaces between physical layer circuitry 62 and a router 70. Router 70 may be hardware, or represent operations performed through software or firmware. As used herein, the term router is not intended to have a restrictive technical meaning, but is rather intended to be interpreted broadly to include any circuitry that performs one or more of the operations described herein. Router 70 may, but is not required to, perform operations such as storing, error checking, translating, and provides the data signals (perhaps through an associated MAC) to the physical device connected to the opposite port. Router 70 may have a bridge operation and/or repeater operation. Router 70 routes signal from one protocol (RF) to another protocol (powerline) and vice versa. Router 70 may be thought of as a protocol converter or protocol matcher. Router 70 may be in a commercial available chip or a specially made chip.

Access point 54 may be a bidirectional repeater. If access point 54 receives a signal on powerline 14, it provides the signal to antenna 64. If access point 54 receives a signal on antenna 64, it provides the signal to powerline 14. Access point 54 thereby extends the network. As an alternative, the sending and receiving features could be performed by different devices.

Figure 2:
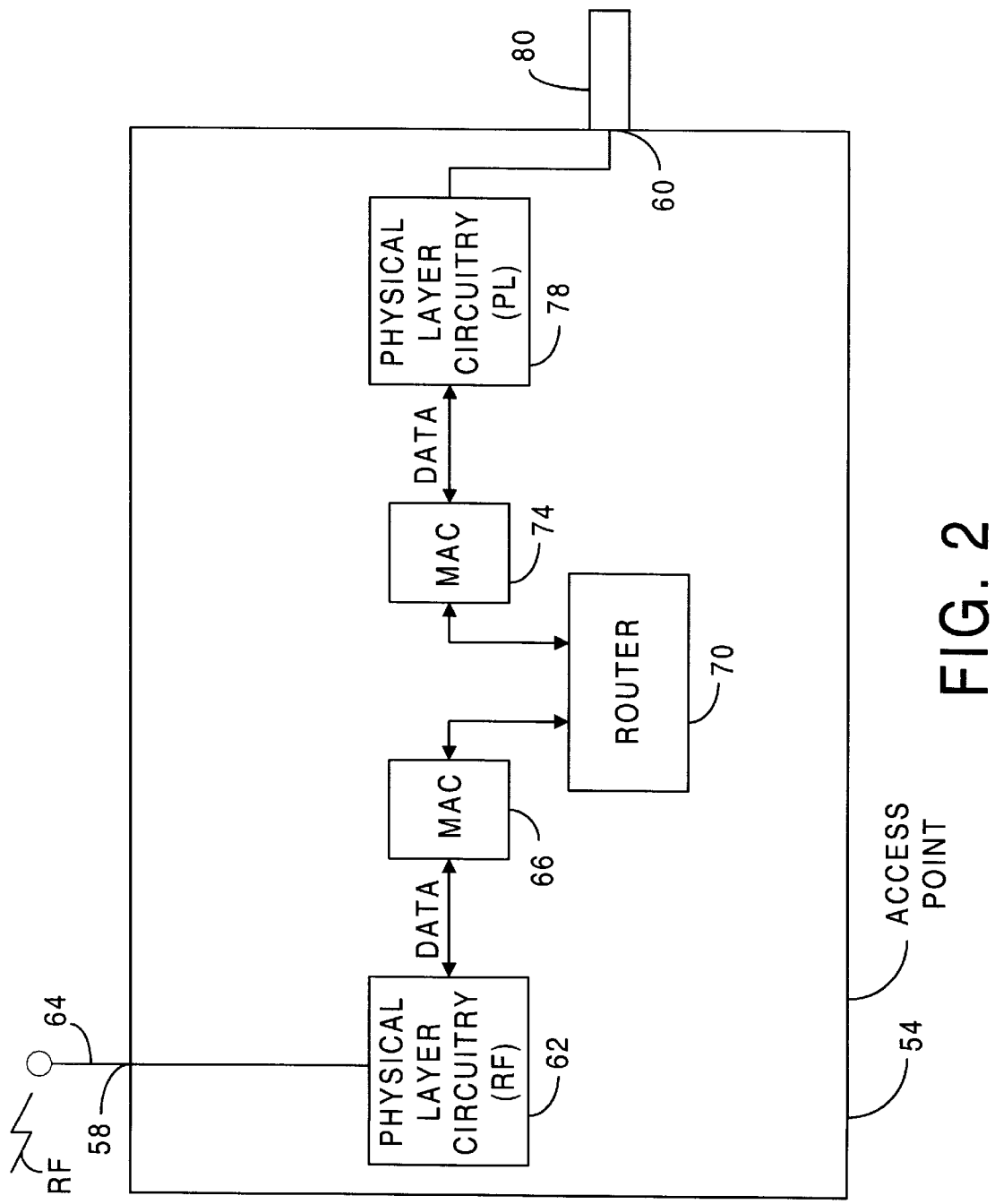

On a powerline side, a MAC 74 interfaces between router 70 and a physical layer circuitry 78 for the powerline. Physical layer circuitry 78 is connected to powerline 14 through port 60 and plug prongs 80 to an outlet. In FIG. 2, access point 54 is in the form of a brick that plugs directly into an outlet.

Physical layer circuitry 62 interfaces with antenna 64 by transmitting and receiving RF signals onto and from antenna 64. (Under an alternative embodiment, more than one antenna may be used.) Physical layer circuitry 78 interfaces with powerline 14 by transmitting and receiving the powerline data and/or control signals onto and from powerline 14. Typically, the powerline data and/or control signals have frequencies that are significantly higher than the power signal (e.g., 60 Hz) on powerline 14. In the example of FIG. 2, MAC 66, router 74, and MAC 74 interface between physical layer circuitry 62 and 78. There may be other circuitry that is not illustrated but which would be well known to those skilled in the art. Merely as an example, physical layer circuitry 62 may include a "Prism" chipset marketed by Harris Semiconductor, Inc., Melbourne, Fla., or any other suitable commercially available or specially made device. Merely as an example, physical layer circuitry 78 may include a model AN1000 chipset marketed by Adaptive Networks, Inc., Cambridge, Mass. or Brighton, Mass., or any other suitable commercially available or specially made device.

In Ethernet technology, it is typical to send data in chunks of 1500 bytes. However, in both powerline communication technology and RF transmit/receive technology, 1500 bytes may be too long a chunk of data to send in a contiguous chunk without having a significant number of errors. It may be more efficient to break it up into smaller pieces and transmit smaller chunks. A MAC may make this adjustment to chunk lengths. For example, desk top computer 26 may want to send data in 1500 byte chunks to portable computer 38. A MAC associated with computer 26 may break the 1500 bytes into smaller chunks of data called blocks and pass the block across powerline 14. MAC 74 takes these blocks and reassembles the blocks to 1500 byte chunks to deliver to router 70. MAC 66 may rebreak up the 1500 byte chunks for RF transmission. Error correction may occur in the MAC or in some other circuitry. Encryption or other security measures may be used. It should be emphasized that the present invention is not restricted to any particular means of signaling on the wire. The details mentioned herein are provided only by way of example, not limitations.

Figure 3:
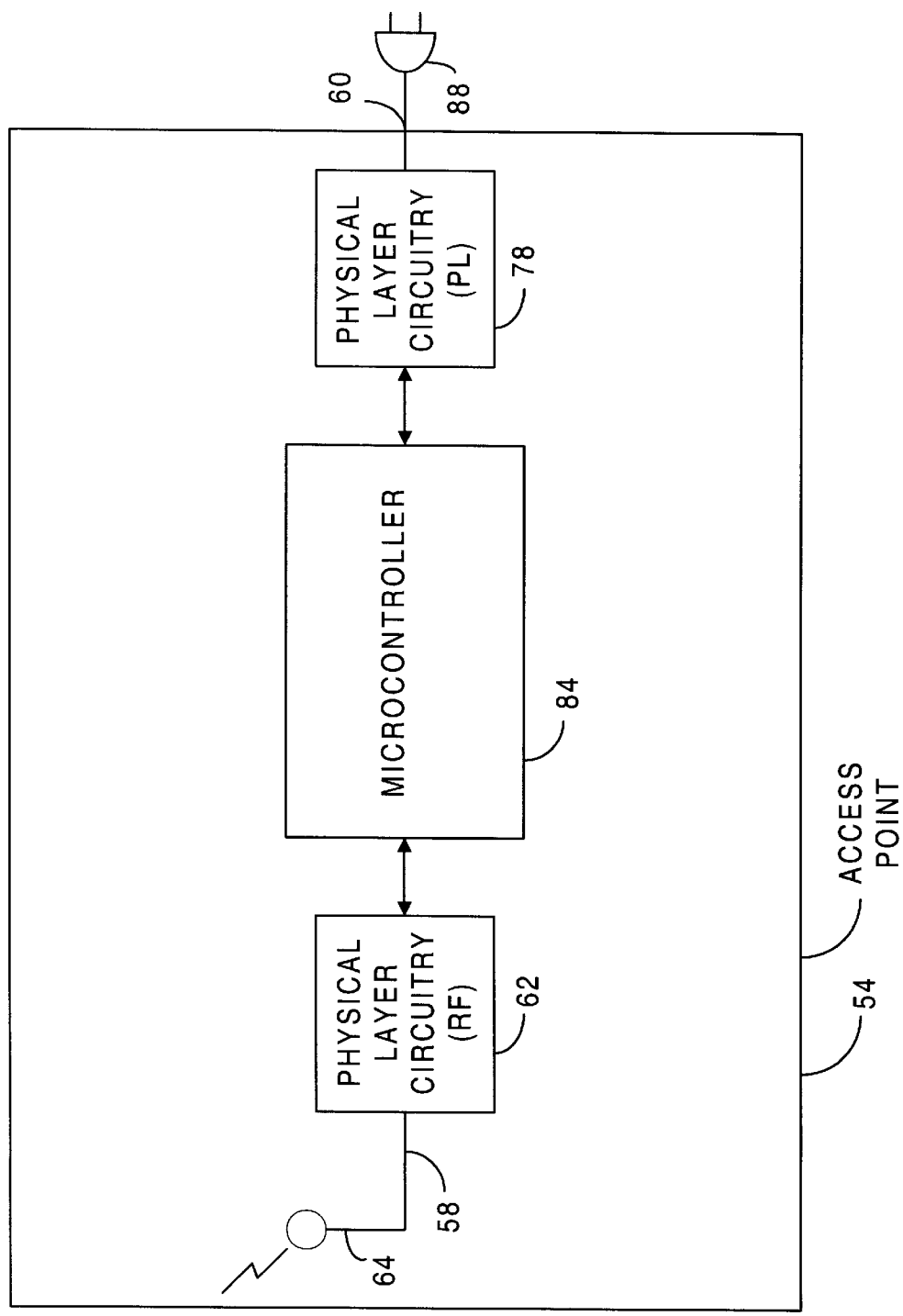

Referring to FIG. 3, the operations of MAC 66, MAC 74, and router 70 may be performed in a microcontroller or microprocessor 84. In FIG. 3, access point 54 is not in the form of a brick, but rather in the form of a box that is connected to powerline 14 through a cord and plug 88. Further, FIG. 3 illustrates that antenna 64 may be internal to packaging of access point 54. In either the access point of FIG. 2 or FIG. 3, the operations of MAC 66 and MAC 74 are optional so that neither MAC 66 nor MAC 74 need be included. Alternatively, in either the access point of FIG. 2 or FIG. 3, MAC 66 could be employed without MAC 74, and MAC 74 could be employed without MAC 66.

Figure 4:
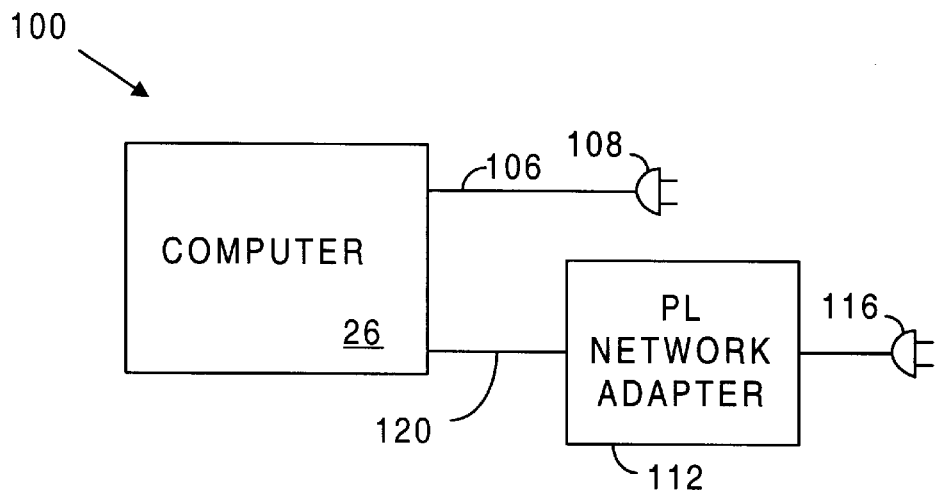

Referring to FIG. 4, merely as an example, a tethered electrical system 100 includes computer 26 that receives electrical power from powerline 14 through a conductor 106 and a plug 108. Computer 26 transmits and receives data and control signals through a powerline (PL) network adapter 112. PL network adapter 112 connects to powerline 14 through a plug 116. PL network adapter 112 may connect with computer 26 through a parallel port cable 120 and a parallel port of computer 26. All or part of the structure of PL network adapter 112 may be incorporated into computer 26, as a separate add on card or part of other components. It is not necessary that both plugs 108 and 116 be used (e.g., power, data, and control signals can pass through the same plug). All or part of the structure of PL network adapter 112 may be incorporated into a brick that plugs into an outlet. Any of various commercially available or especially designed PL network adapters may be employed in connection with an embodiment of the present invention. Merely as an example, PL network adapter 112 may include a model AN1000EVK Evaluation Unit marketed by Adaptive Networks, Inc., Cambridge, Mass. or Brighton, Mass. Information regarding a PL network adapter is known in the art.

Figure 5:
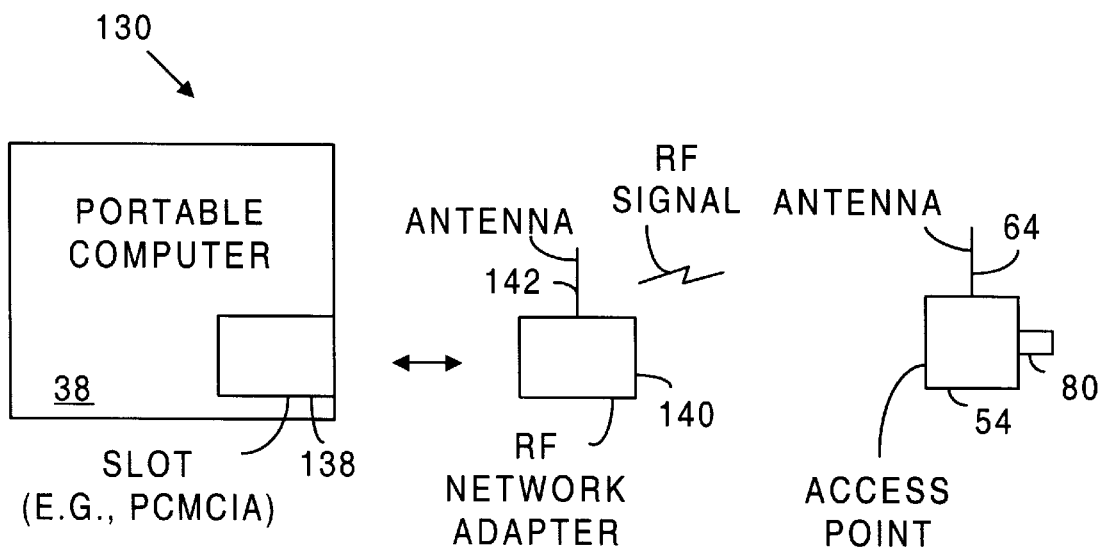

Referring to FIG. 5, merely as an example, an untethered electrical system 130 includes portable computer 38 having a Personal Computer Memory Card International Association (PCMCIA) slot 138. A RF network adapter 140 (which may be in the form of a PCMCIA card) includes an antenna 142 that sends or receives an RF signal to or from an antenna 64 of access point 54. Access point 54 connects to a powerline through prongs 80. (Of course, an access point in a form other than a brick may be used.) The RF network adapter does not have to be in a PCMCIA card. For example, info pad 10 or combo phone 42 may have a built in RF network adapter. If not built in, the RF network adapter may be attached through, for example, Velcro, a strap, or some other means. The RF network adapter may be especially designed or from commercially available components. For example, various RF network adapters are commercially available, such as the Prism chipset, marketed by Harris Semiconductor, Inc., Melbourne, Fla.

FIG. 6A illustrates two cells, cell 1 and cell 2, within a network. The cells represent the area over which an access point can transmit to an untethered device or can receive from an untethered device. The actual area of a cell may be something other than a circle because of, for example, walls and unequal transmitting power of the access point in different directions. Also, an untethered device may have a different transmitting power than the access point. Further, different untethered electrical devices may have different transmitting powers and receiving abilities. Therefore, for simplicity, the illustrated circle of cell 1 provides only a general area and does not simultaneously represent all transmitting or receiving areas that could be associated with access, point 54 and various untethered electrical devices. The same applies to cell 2. In FIG. 6A, there is no overlap between cell 1 and cell 2. In FIG. 6B, however, there is an overlap of cell 1 and cell 2. For example, an untethered device, such as portable computer 38 could transmit to both access point 54 and access point 56.

When an untethered device can transmit a signal to more than one access point, it is desirable that there be some mechanism to prevent incorrect responses to the signal. For example, referring to FIG. 1, portable computer 38 may send a print command to printer 28. If both access points 54 and 56 received the command, printer 28 may print twice or experience other incorrect results.

Figure 7:
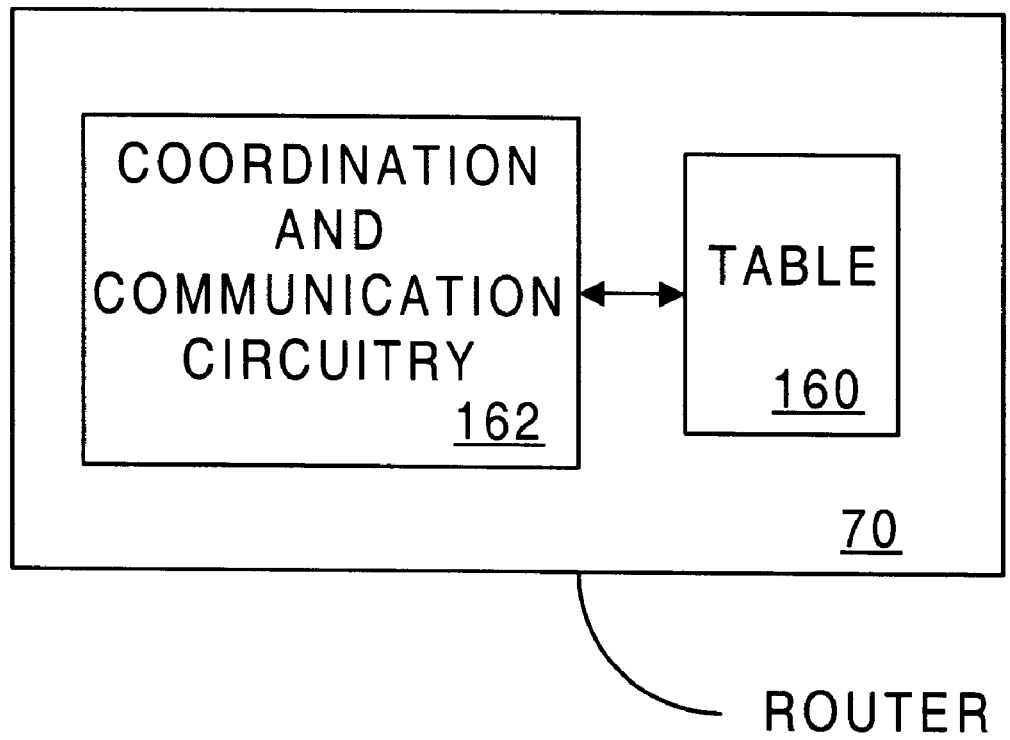

Under one embodiment of the invention, one mechanism for preventing such a problem, is for each access point (e.g., access points 54 and 56) to perform a point coordination operation with other access points, whereby each untethered device (transmitting station) is assigned to only one access point. Referring to FIG. 7, under one embodiment, each access point (e.g., in router 70) keeps a table 160 of addresses of untethered devices that the access point is responsible to access. Under one embodiment, the tables hold only the addresses of untethered devices for which the access point is responsible. Under another embodiment, the tables (or separate tables) could also hold addresses of untethered devices for which the access point is not responsible. The different access points communicate with each other (e.g., through coordination and communication circuitry 162) over powerline 14 to decide which access point is assigned to which untethered device. As the untethered device moves, the assignment may change to a different access point. The point coordination operation may be according to the current radio communication network protocol standard IEEE 802.11, although the invention is not so limited.

The PL and RF adapters may also have some sort of table, filter, or other technique to process whether to transmit a particular signal depending on the address of the devices to which the signal is directed.

The present invention has the advantage that access points may be moved to different locations in a house or building as desired. Further, a system is scaleable in that more access points can be purchased and added to the network as they are needed, holding down initial investment.

Commercial embodiments of the invention may include various details not specifically described herein, but which are within the knowledge of the those skilled in the art. Such details typically vary from embodiment to embodiment.

When the present disclosure uses the term "in one embodiment" followed by a feature, it does not suggest that only one embodiment of the invention may include that feature. Further, it is not necessarily the same embodiment that is referred to when a two features are each described as being "in one embodiment."

The term "conductor" is intended to be interpreted broadly and includes devices that conducts although they also have some insulating properties.

The term "connected" and "coupled," are used in an operational sense and are not necessarily limited to a direct connection or direct coupling. For example, portable computer 38 is coupled to power line 14 through RF adapter 140, RF signal 46, and access point 54 or 56. If the specification states a component "may", "can", "could", or is "preferred" to be included or have a characteristic, that particular component is not required to be included or have the characteristic. The term "responsive" may include complete or only partial responsiveness.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. An access point comprising: first physical layer circuitry to interface with an external electrical line;

second physical layer circuitry to interface with an antenna;

interface circuitry to interface between the first and second physical layer, circuitry; and coordination circuitry to perform a point coordination operation to assign an untethered device to the access point.

2. The access point of claim 1, wherein the first and second physical layer circuitry and the circuitry to interface between the first and second physical layer circuitry allow an untethered electrical device to have data communication through the electrical line with an electrical device tethered to the electrical line.

3. The access point of claim 1, wherein the circuitry to interface between the first and second physical layer circuitry includes a router.

4. The access point of claim 1, wherein the coordination circuitry includes a table holding the address of the untethered device.

5. The access point of claim 1, wherein the coordination circuitry includes communication circuitry.

6. The access point of claim 1, further comprising the antenna.

7. The access point of claim 1, wherein the access point is a brick having a package and prongs that are supported by the package.

8. The access point of claim 1, wherein the access point includes a package which is separated from prongs by a conductor.

9. An access point comprising:

a conductor;

an antenna to transmit and receive wireless signals;

router circuitry connected to the conductor and antenna to change communications protocols between the conductor and the antenna; and coordination circuitry to perform a point coordination operation to assign an untethered device to the access point.

10. The access point of claim 9, wherein the wireless signals are RF signals.

11. The access point of claim 9, wherein the conductor is connected to a plug for connection to an outlet of a powerline.

12. The access point of claim 9, wherein the access point is a brick having a package and prongs that are connected to the conductor and supported by the package.

13. A powerline based network, comprising:

a powerline;

an access point connected to the powerline and capable of wireless communication; and coordination circuitry to assign an untethered device to the access point.

14. The network of claim 13, further comprising:

an electrical device tethered to the powerline; and wherein the untethered electrical device is in wireless communication with the access point, and through the access point to the tethered electrical device.

15. The network of claim 14, wherein the wireless communication includes data communication.

16. The network of claim 14, wherein the coordination circuitry performs a point coordination operation to assign the untethered device to the access point.

17. The network of claim 14, wherein the tethered electrical devices is connected to the powerline through a powerline network adapter.

18. The network of claim 14, further comprising an RF network adapter connected to the untethered electrical device, and wherein the wireless communication between the untethered electrical device and the access point is through the RF network adapter.

19. The network of claim 18, wherein the RF network adapter is included within the untethered electrical device.

20. The network of claim 14, wherein the access point is a first access point and wherein the network comprises a second access point connected to the powerline and capable of wireless communication.

21. The network of claim 20, wherein the second access point includes coordination circuitry to perform a point coordination operation to assign the untethered device to the one of the first and second access points.

22. The network of claim 21, wherein the coordination circuitry of the second access point performs a point coordination operation includes a table holding the address of the untethered device.

23. A network, comprising:

an electrical line; and a first access point connected to the electrical line and capable of providing wireless communication within a first cell; and a second access point connected to the electrical line and capable of providing wireless communication within a second cell; and a first untethered electrical device and a second untethered electrical device; and wherein the first and second access points each include circuitry to perform a point coordination operation to assign the first and second untethered electrical devices among the first and second access points.

24. The network of claim 23, wherein the first and second cells do not overlap.

25. The network of claim 23, wherein the first and second cells do overlap.

26. The network of claim 23, wherein the first and second access points include circuitry to determine whether the first or the second access point is responsible for communicating with a particular untethered electrical device.

27. A network, comprising:

a conductor; and a first access point connected to the conductor and capable of providing wireless communication within a first cell; and a second access point connected to the conductor and capable of providing wireless communication within a second cell, wherein the first and second cells do overlap.

28. A network, comprising:

a conductor; and a first access point connected to the conductor and capable of providing wireless communication within a first cell; and a second access point connected to the conductor and capable of providing wireless communication within a second cell, wherein the first and second access points include circuitry to determine whether the first or the second access point is responsible for communicating with a particular untethered electrical device.

\* \* \* \* \*